United States Patent
Kon et al.

(10) Patent No.: US 12,434,333 B2
(45) Date of Patent: Oct. 7, 2025

(54) FLUX-CORED WIRE FOR USE WITH Ar-CO2 MIXED GAS

(71) Applicant: Kabushiki Kaisha Kobe Seiko Sho (Kobe Steel, Ltd.), Kobe (JP)

(72) Inventors: Satoshi Kon, Kanagawa (JP); Naoya Sawaguchi, Kanagawa (JP)

(73) Assignee: Kobe Steel, Ltd., Kobe (JP)

( * ) Notice: Subject to any disclaimer, the term of this patent is extended or adjusted under 35 U.S.C. 154(b) by 839 days.

(21) Appl. No.: 17/625,667

(22) PCT Filed: Jun. 24, 2020

(86) PCT No.: PCT/JP2020/024816
§ 371 (c)(1),
(2) Date: Jan. 7, 2022

(87) PCT Pub. No.: WO2021/006040
PCT Pub. Date: Jan. 14, 2021

(65) Prior Publication Data
US 2022/0258290 A1    Aug. 18, 2022

(30) Foreign Application Priority Data
Jul. 9, 2019 (JP) .................... 2019-127697

(51) Int. Cl.
*B23K 35/30* (2006.01)
*B23K 35/368* (2006.01)
(Continued)

(52) U.S. Cl.
CPC ........ *B23K 35/3073* (2013.01); *B23K 35/368* (2013.01); *C22C 38/002* (2013.01);
(Continued)

(58) Field of Classification Search
CPC ............. B23K 35/3073; B23K 35/368; B23K 35/3601; B23K 35/3607; B23K 35/3608;
(Continued)

(56) References Cited

U.S. PATENT DOCUMENTS

| | | |
|---|---|---|
| 5,580,475 A | 12/1996 | Sakai et al. |
| 2009/0261085 A1* | 10/2009 | Suzuki ................. B23K 35/362 |
| | | 219/145.22 |
| 2020/0070273 A1* | 3/2020 | Watanabe .............. B23K 35/36 |

FOREIGN PATENT DOCUMENTS

| | | |
|---|---|---|
| JP | 6-226492 A | 8/1994 |
| JP | 8-99192 A | 4/1996 |

(Continued)

OTHER PUBLICATIONS

International Search Report mailed on Aug. 25, 2020 in PCT/JP2020/024816 filed on Jun. 24, 2020 (2 pages).

*Primary Examiner* — Rebecca Janssen
(74) *Attorney, Agent, or Firm* — Oblon, McClelland, Maier &Neustadt, L.L.P.

(57) ABSTRACT

A flux-cored wire may be used with an Ar—$CO_2$ mixed gas, the wire having a steel sheath filled with a flux. Such flux-cored wires may include, as a total of the steel sheath and the flux, relative to a total wire mass: Fe in 92 mass % or more, total Si in a 0.50 mass % or more and 1.50 mass % 15 or less, Mn in 1.00 mass % or more and 3.00 mass % or less, total Li in 0.010 mass % or more and 0.10 mass % or less, and total Mg in 0.02 mass % or more and less than 0.50 mass %, C in 0.15 mass % or less, P in 0.030 mass % or less, S in 0.030 mass % or less, and a slag forming agent in 0.50 mass % or less.

18 Claims, 1 Drawing Sheet

(51) Int. Cl.
   *C22C 38/00*    (2006.01)
   *C22C 38/02*    (2006.01)
   *C22C 38/04*    (2006.01)
   *C22C 38/14*    (2006.01)

(52) U.S. Cl.
   CPC .............. *C22C 38/02* (2013.01); *C22C 38/04* (2013.01); *C22C 38/14* (2013.01)

(58) Field of Classification Search
   CPC .......................... B23K 35/361; B23K 35/0266; C22C 38/002; C22C 38/02; C22C 38/04; C22C 38/14; Y02P 10/20
   See application file for complete search history.

(56) References Cited

FOREIGN PATENT DOCUMENTS

| | | |
|---|---|---|
| JP | 2017-74599 A | 4/2017 |
| NO | 20161607 A1 | 4/2017 |

\* cited by examiner

FLUX-CORED WIRE FOR USE WITH Ar-CO2 MIXED GAS

CROSS-REFERENCE TO RELATED APPLICATIONS

The present application is the national stage of international application PCT/JP2020/024816, filed on Jun. 24, 2020, and claims the benefit of the filing date of Japanese Appl. No. 2019-127697, filed on Jul. 9, 2019.

TECHNICAL FIELD

The present invention relates to a flux-cored wire for use with an Ar—$CO_2$ mixed gas.

BACKGROUND ART

Generally, in the fields of steel frames, bridges, and shipbuilding, a flux-cored wire for gas shielded arc welding, which enables high-efficiency welding for welded structures, is frequently used. For example, Patent Literature 1 proposes a flux-cored wire for gas shielded arc welding, which enables high-efficiency welding and prevention of occurrence of defects in a shape of a bead by appropriately controlling flux components and metal components in a wire.

In recent years, various studies have been made on a metal-based flux-cored wire, which enables easy welding and welding with high welding efficiency, and gives small amount of slag generated.

For example, Patent Literature 2 discloses a metal-based flux-cored wire for gas shielded arc welding, which can contribute to a reduction in the amount of generated fume by adjusting the content of metal components in a soft steel sheath and appropriately adjusting the content of metal components, oxides, and fluorides in a flux.

However, in a situation of horizontal fillet welding in the field of steel frames, bridges, and shipbuilding, a flux-cored wire that can give good slag removability is recently required, and the flux-cored wires described in Patent Literatures 1 and 2 may not give excellent slag removability. In a case where there is a region where the slag removability is poor, there is a problem that the slag adheres to the region to form a mottled pattern, resulting in impairing an appearance of the bead. In addition, in a case where the slag removability deteriorates due to seizure of slag, extra manpower is required for a slag removal operation for obtaining a good welded portion, which may cause a significant increase in labor and cost.

Patent Literature 3 proposes a metal-based flux-cored wire which can give a weld metal having good slag removability, good appearance and shape of the bead, excellent crack resistance, and good mechanical properties by limiting the content of components in a steel sheath and a flux and appropriately adjusting the content of a fluorine compound, $SiO_2$, a Na compound, a K compound, and an iron powder in the flux.

CITATION LIST

Patent Literature

Patent Literature 1: JP H08-99192 A
Patent Literature 2: JP H06-226492 A
Patent Literature 3: JP 2017-74599 A

SUMMARY OF INVENTION

Technical Problem

However, when the slag aggregation is poor even in the case of using the flux-cored wire described in Patent Literature 3, a covering state of the slag with respect to the bead may become non-uniform, and slag seizure on the bead occurs in a portion in which the thickness of the slag is small, which causes a problem that the slag removability deteriorates. There is also a demand for further development of a flux-cored wire which can give a weld metal having excellent toughness within a temperature range of approximately −40° C.

The present invention has been made in view of the above circumstances, and an object of the present invention is to provide a flux-cored wire for use with an Ar—$CO_2$ mixed gas, which can give a weld metal having good slag aggregation and slag removability and excellent low-temperature toughness.

Solution to Problem

As a result of intensive studies to solve the above problems, the present inventors have found that the slag aggregation can be significantly enhanced by controlling a content of Mg in a wire and a weld metal. It is presumed that this is because Mg has an effect of increasing a difference between a surface tension of the weld metal and a surface tension of a slag. In addition, the present inventors have found that the balance between the content of Mg and the slag forming agent also greatly affects the slag aggregation. That is, when the slag forming agent is contained in a large amount, the amount of slag increases even if an appropriate amount of Mg is contained, and thus, the slag aggregation effect cannot be obtained. In addition, when the content of Mg is large, the amount of slag precipitated increases, and as a result, the slag aggregation effect cannot be obtained.

Furthermore, the present inventors have found that a weld metal having excellent low-temperature toughness can be obtained by controlling the other components in the wire to a predetermined range.

The present invention has been made based on these findings.

A flux-cored wire according to an aspect of the present invention is a flux-cored wire for use with an Ar—$CO_2$ mixed gas, which has a steel sheath filled with a flux, the flux-cored wire comprising, as a total of the steel sheath and the flux, relative to a total mass of the wire:

Fe: 92 mass % or more;

total Si: 0.50 mass % or more and 1.50 mass % or less;

Mn: 1.00 mass % or more and 3.00 mass % or less;

total Li: 0.010 mass % or more and 0.10 mass % or less; and total Mg: 0.02 mass % or more and less than 0.50 mass %, wherein a content of C is 0.15 mass % or less, a content of P is 0.030 mass % or less, a content of S is 0.030 mass % or less, and a content of a slag forming agent is 0.50 mass % or less.

In the flux-cored wire, the slag forming agent preferably contains any one or more of a Mg compound, a Li compound, a Ti compound, a Si compound, a Zr compound, a Fe compound, an Al compound, a Na compound, and a fluoride.

The flux-cored wire preferably contains, as the total of the steel sheath and the flux, relative to the total mass of the wire: metal Ti: less than 0.17 mass %.

Advantageous Effects of Invention

The present invention can provide a flux-cored wire for use with an Ar—$CO_2$ mixed gas, which can give a weld metal having good slag aggregation and slag removability and excellent low-temperature toughness.

DESCRIPTION OF EMBODIMENTS

Figure 1:
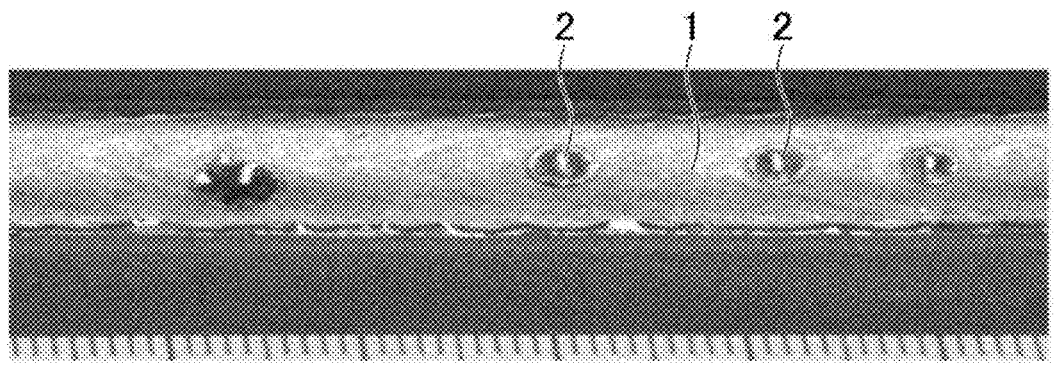
FIG. 1 is a photograph as a substitute for a drawing showing a surface of a weld metal obtained by welding using the wire in Invention Example No. 1.

Hereinafter, embodiments for carrying out the present invention are described in detail. It should be noted that the present invention is not limited to the embodiments described below, and may be arbitrarily changed without departing from the scope of the present invention. Hereinafter, the flux-cored wire for use with an Ar—$CO_2$ mixed gas in the present embodiment is described.

[Flux-Cored Wire]

In the flux-cored wire in the present embodiment, a stainless steel sheath (hoop) is filled with a flux. Specifically, the flux-cored wire in the present embodiment includes a steel sheath having a tubular shape and a flux with which the steel sheath is filled. The flux-cored wire may be in any form of a seamless type flux-cored wire having no seam in the sheath, or a seam type flux-cored wire having formed into a tubular shape such as a C cross section or an overlapped cross section and having a seam in the sheath.

Next, regarding a chemical component contained in the flux and sheath of the flux-cored wire for use with an Ar—$CO_2$ mixed gas in the present embodiment, the reason for the addition of the chemical component and the reason for limiting the numerical value thereof are described in detail. Each element for obtaining the weld metal having the required properties may be added to at least one of a steel sheath and a filling flux. Therefore, unless otherwise specified in the following description, the amount of each component in the flux-cored wire is specified by a value of the total amount of the components contained in the steel sheath and the flux relative to the total mass of the wire (the total amount of the steel sheath and the flux inside the sheath).

<Fe: 92.00 Mass % or More>

Fe is a main component of the flux-cored wire in the present embodiment. From the deposition amount and the relationship with the composition of other components, the content of Fe in the steel sheath and the flux is 92.00 mass % or more, preferably 95.00 mass % or more, and more preferably 96.00 mass % or more, relative to the total mass of the wire. In addition, it is practical that the content of Fe is 98.00 mass % or less.

<C: 0.15 Mass % or Less>

C is a component having an effect of ensuring the desired strength of the weld metal, but in a case where the content of C in the wire is more than 0.15 mass %, the slag aggregation decreases due to an increase in the amount of slag. Therefore, the content of C in the wire is 0.15 mass % or less, preferably 0.13 mass % or less, and more preferably 0.11 mass % or less.

<Total Si: 0.50 Mass % or More and 1.50 Mass % or Less>

The total Si means a value obtained by converting the total of metal Si and Si compounds contained in the steel sheath and the flux into Si. In addition, the metal Si means the total of Si contained in elemental Si and alloy of Si.

Si is a component having an effect of ensuring a desired strength of the weld metal.

In a case where a content of the total Si is less than 0.50 mass %, it is difficult to obtain the above effect. Therefore, the content of the total Si in the steel sheath and the flux is 0.50 mass % or more, preferably 0.60 mass % or more, and more preferably 0.70 mass % or more, relative to the total mass of the wire.

On the other hand, in a case where the content of the total Si is more than 1.50 mass %, the amount of slag increases, and the slag aggregation decreases. Therefore, the content of the total Si in the steel sheath and the flux is 1.50 mass % or less, preferably 1.35 mass % or less, and more preferably 1.20 mass % or less, relative to the total mass of the wire.

The Si compound is preferably contained within a range of 0.20 mass % or less in terms of a $SiO_2$ conversion value. Examples of the Si compound include a Si oxide and the like.

<Mn: 1.00 Mass % or More and 3.00 Mass % or Less>

Mn is a component having an effect of ensuring a desired strength of the weld metal.

In a case where a content of Mn is less than 1.00 mass %, it is difficult to obtain the above effect. Therefore, the content of Mn in the steel sheath and the flux is 1.00 mass % or more, preferably 1.15 mass % or more, and more preferably 1.30 mass % or more, relative to the total mass of the wire.

On the other hand, in a case where the content of Mn is more than 3.00 mass %, the amount of slag increases, and the slag aggregation decreases. Therefore, the content of Mn in the steel sheath and the flux is 3.00 mass % or less, preferably 2.75 mass % or less, and more preferably 2.50 mass % or less, relative to the total mass of the wire.

<Total Li: 0.010 Mass % or More and 0.10 Mass % or Less>

The total Li means a value obtained by converting the total of metal Li and Li compounds contained in the steel sheath and the flux into Li. In addition, the metal Li means the total of Li contained in elemental Li and alloy of Li.

Li is a component that can improve arc stability. Na and K also have the effect of improving the arc stability, but the amount of fume generated may be large. Therefore, in the present embodiment, Li that can prevent the generation of fume as compared with Na and K is contained.

In a case where a content of the total Li is less than 0.010 mass %, it is difficult to obtain the above effect. Therefore, the content of the total Li in the steel sheath and the flux is 0.010 mass % or more, preferably 0.015 mass % or more, and more preferably 0.020 mass % or more, relative to the total mass of the wire.

On the other hand, in a case where the content of the total Li is more than 0.10 mass %, the amount of slag increases, and the slag aggregation decreases. Therefore, the content of the total Li in the steel sheath and the flux is 0.10 mass % or less, preferably 0.085 mass % or less, and more preferably 0.070 mass % or less, relative to the total mass of the wire.

Examples of the Li source include Li compounds such as fluorides and Li oxides, and Li alloys such as Li—Fe. These may be used alone or in combination, and the Li alloys are preferably used.

<Total Mg: 0.02 Mass % or More and Less Than 0.50 Mass %>

The total Mg means a value obtained by converting the total of metal Mg and Mg compounds contained in the steel sheath and the flux into Mg. In addition, the metal Mg means the total of Mg contained in elemental Mg and alloy of Mg.

Here, Mg is a component having an effect of enhancing the slag aggregation. It is presumed that the effect of the slag aggregation is obtained because Mg has an effect of increasing a difference between a surface tension of the weld metal and a surface tension of a slag.

In a case where the content of the total Mg is less than 0.02 mass %, it is difficult to obtain the above effect. Therefore, the content of the total Mg in the steel sheath and the flux is 0.02 mass % or more, preferably 0.03 mass % or more, and more preferably 0.04 mass % or more, relative to the total mass of the wire.

On the other hand, in a case where the content of the total Mg is 0.50 mass % or more, the amount of slag increases due to the formation of the Mg oxide, and the slag aggregation decreases. Therefore, the content of the total Mg in the steel sheath and the flux is less than 0.50 mass %, and preferably less than 0.48 mass %, relative to the total mass of the wire.

Examples of the Mg compound include MgO and the like.

<P: 0.030 Mass % or Less (Including 0 Mass %)>

P is an impurity element, and in a case where a content of P in the wire is more than 0.030 mass %, the toughness of the weld metal decreases and the sensitivity to hot cracking increases. Therefore, the content of P in the steel sheath and the flux is 0.030 mass % or less, and preferably 0.020 mass % or less, relative to the total mass of the wire.

<S: 0.030 Mass % or Less (Including 0 Mass %)>

S is also an impurity element similarly to P, and in a case where a content of S in the wire is more than 0.030 mass %, the toughness of the weld metal decreases and the sensitivity to hot cracking increases. Therefore, the content of S in the steel sheath and the flux is 0.030 mass % or less, and preferably 0.020 mass % or less, relative to the total mass of the wire.

<Metal Ti: Less Than 0.17 MASS % (including 0 Mass %)>

Ti is a component that can improve arc stability, but the flux-cored wire in the present embodiment containing Li as an essential component does not necessarily need to contain the metal Ti. In a case where a content of the metal Ti in the wire is less than 0.17 mass %, excessive generation of slag is prevented, and the slag aggregation is improved. Therefore, the content of the metal Ti in the steel sheath and the flux is less than 0.17 mass %, preferably 0.14 mass % or less, and more preferably 0.10 mass % or less, relative to the total mass of the wire.

<Slag Forming Agent: 0.50 Mass % or Less (Including 0 Mass %)>

The slag forming agent refers to a compound such as an oxide, a fluoride, an alkali metal compound, or the like in the flux. The flux-cored wire in the present embodiment does not necessarily need to contain the slag forming agent. In a case where the content of the slag forming agent is more than 0.50 mass %, the amount of slag increases, and the slag aggregation decreases. That is, when the amount of slag is too much larger than the predetermined amount, the effect of the wire in the present embodiment cannot be obtained even if the content of Mg is controlled to fall within the above-described range. Therefore, the content of the slag forming agent in the steel sheath and the flux is 0.50 mass % or less, preferably 0.40 mass % or less, and more preferably 0.30 mass % or less, relative to the total mass of the wire.

The slag forming agent is preferably any one or more of a Mg compound, a Li compound, a Ti compound, a Si compound, a Zr compound, a Fe compound, an Al compound, a Na compound, and a fluoride. The content of each of the oxides and the fluoride is preferably within the following range.

<Ti Compound: 0.50 Mass % or Less (Including 0 Mass %)>

The Ti compound is, for example, a Ti oxide, and a content of the Ti compound is 0.50 mass % or less, and preferably 0.30 mass % or less, in terms of a $TiO_2$ conversion value. In a case where the content of the Ti oxide is more than 0.50 mass % in terms of a $TiO_2$ conversion value, the slag aggregation decreases.

<Si Compound: 0.20 Mass % or Less (Including 0 Mass %)>

The Si compound is, for example, a Si oxide, and a content of the Si compound is 0.20 mass % or less, and preferably 0.10 mass % or less, in terms of a $SiO_2$ conversion value. In a case where the content of the Si compound is more than 0.20 mass % in terms of a $SiO_2$ conversion value, the slag aggregation decreases.

<Zr Compound: 0.20 Mass % or Less (Including 0 Mass %)>

The Zr compound is, for example, a Zr oxide, and a content of the Zr compound is 0.20 mass % or less, and preferably 0.10 mass % or less, in terms of a $ZrO_2$ conversion value. In a case where the content of the Zr compound is more than 0.20 mass % in terms of a $ZrO_2$ conversion value, the slag aggregation decreases.

<Fe Compound: 0.50 Mass % or Less (Including 0 Mass %)>

The Fe compound is, for example, a Fe oxide, and a content of the Fe compound is 0.50 mass % or less, and preferably 0.30 mass % or less, in terms of a $Fe_2O_3$ conversion value. In a case where the content of the Fe compound is more than 0.50 mass % in terms of a $Fe_2O_3$ conversion value, the slag aggregation decreases.

<Al Compound: 0.50 Mass % or Less (Including 0 Mass %)>

The Al compound is, for example, an Al oxide, and a content of the Al compound is 0.50 mass % or less, and preferably 0.30 mass % or less, in terms of an $Al_2O_3$ conversion value. In a case where the content of the Al compound is more than 0.50 mass % in terms of an $Al_2O_3$ conversion value, the slag aggregation decreases.

<Na Compound: 0.50 Mass % or Less (Including 0 Mass %)>

In the present embodiment, a content of the Na oxide is 0.50 mass % or less, and preferably 0.30 mass % or less, in terms of a $Na_2O$ conversion value. In a case where the content of the Na oxide is more than 0.50 mass % in terms of a $Na_2O$ conversion value, the slag aggregation decreases.

<Fluoride: 0.30 Mass % or Less (Including 0 Mass %)>

In the present embodiment, a content of the fluoride is 0.30 mass % or less, and preferably 0.20 mass % or less, in terms of a F conversion value. In a case where the content of the fluoride is more than 0.30 mass % in terms of a F conversion value, the slag aggregation decreases.

Examples of the F source include metal fluorides such as alkaline metal fluorides, alkaline earth metal fluorides, and rare earth element fluorides, for example, $K_2SiF_6$, $Na_3AlF_6$, LiF, and CeF3, and these may be used alone or in combination.

<Other Components>

In the flux-cored wire in the present embodiment, in addition to the components of the wire described above, various metal components or slag forming agent may be added to the flux to the extent that the effects thereof are not impaired, and the kind and amount thereof are not limited. For example, as the metal component, Cu, V, W, N and the like may be contained in the wire from the viewpoint of corrosion resistance and mechanical performance, and the total amount thereof is, for example, less than 0.30 mass %.

In addition, as the balance of the flux-cored wire in the present embodiment, inevitable impurities are contained, and examples of the inevitable impurities include $R_2O_3$, $Nb_2O_5$, and $V_2O_5$, in addition to P and S described above.

<Production of Wire>

Flux-cored wires having a wire diameter of 1.2 mm were produced such that the components of the wires had various contents. The chemical components in the steel sheath and the flux, and the respective contents (mass %) thereof relative to the total mass of the wire are shown in Table 1 below. The balance excluding the chemical components shown in Table 1 below in the wire is inevitable impurities. In addition, "-" in Table 1 indicates that the component is not added or the content is at an impurity level. The value of the slag forming agent in Table means the total of oxides, fluorides in a F conversion value, Mg compounds, and Li compounds listed in Table.

TABLE 1

Chemical components (mass %) in steel sheath and flux

| | No. | Fe | C | Total Si | Mn | P | S | Metal Ti | Total Li | Total Mg | F conversion value | $TiO_2$ | $SiO_2$ | $ZrO_2$ | $Al_2O_3$ | $Fe_2O_2$ | $Na_2O$ | Slag forming agent |
|---|---|---|---|---|---|---|---|---|---|---|---|---|---|---|---|---|---|---|
| Invention Example | 1 | 96.7 | 0.10 | 1.01 | 1.82 | 0.008 | 0.009 | — | 0.03 | 0.05 | 0.02 | — | — | — | — | 0.13 | — | 0.17 |
| | 2 | 96.6 | 0.06 | 1.02 | 1.85 | 0.008 | 0.009 | — | 0.03 | 0.16 | 0.02 | — | — | — | — | 0.13 | — | 0.17 |
| | 3 | 96.5 | 0.06 | 1.02 | 1.85 | 0.008 | 0.009 | — | 0.03 | 0.31 | 0.02 | — | — | — | — | 0.13 | — | 0.17 |
| | 4 | 96.5 | 0.06 | 1.02 | 1.85 | 0.008 | 0.009 | — | 0.03 | 0.16 | 0.02 | — | — | — | — | 0.13 | — | 0.26 |
| | 5 | 96.5 | 0.06 | 1.02 | 1.85 | 0.008 | 0.009 | — | 0.03 | 0.16 | 0.17 | — | — | — | — | 0.13 | — | 0.33 |
| | 6 | 96.3 | 0.06 | 1.02 | 1.85 | 0.008 | 0.009 | — | 0.03 | 0.47 | 0.17 | — | — | — | — | 0.13 | — | 0.33 |
| | 7 | 96.7 | 0.10 | 1.01 | 1.82 | 0.008 | 0.009 | — | 0.03 | 0.05 | 0.02 | — | — | — | — | 0.13 | — | 0.17 |
| | 8 | 96.7 | 0.10 | 1.01 | 1.82 | 0.008 | 0.009 | — | 0.03 | 0.09 | 0.02 | — | — | — | — | 0.13 | — | 0.17 |
| | 9 | 96.7 | 0.10 | 1.01 | 1.82 | 0.008 | 0.009 | — | 0.03 | 0.10 | 0.02 | — | — | — | — | 0.13 | — | 0.17 |
| | 10 | 96.7 | 0.10 | 1.01 | 1.82 | 0.008 | 0.009 | 0.02 | 0.03 | 0.05 | 0.02 | — | — | — | — | 0.13 | — | 0.22 |
| | 11 | 96.7 | 0.10 | 1.01 | 1.82 | 0.008 | 0.009 | 0.02 | 0.03 | 0.05 | 0.02 | — | — | — | — | 0.13 | — | 0.22 |
| Comparative Example | 1 | 96.8 | 0.06 | 1.02 | 1.85 | 0.008 | 0.009 | — | 0.03 | — | 0.02 | — | — | — | — | 0.13 | — | 0.17 |
| | 2 | 96.5 | 0.06 | 1.02 | 1.85 | 0.008 | 0.009 | — | 0.03 | — | 0.33 | — | — | — | — | 0.13 | — | 0.49 |
| | 3 | 96.5 | 0.06 | 1.02 | 1.85 | 0.008 | 0.009 | — | 0.03 | 0.94 | 0.17 | — | — | — | — | 0.13 | — | 0.33 |
| | 4 | 96.6 | 0.06 | 1.04 | 1.84 | 0.008 | 0.009 | 0.17 | 0.03 | — | 0.02 | — | — | — | — | 0.13 | 0.03 | 0.28 |
| | 5 | 96.6 | 0.06 | 1.04 | 1.84 | 0.008 | 0.009 | 0.17 | 0.03 | — | 0.02 | — | — | — | — | 0.13 | — | 0.17 |
| | 6 | 96.4 | 0.05 | 0.88 | 1.65 | 0.008 | 0.009 | 0.17 | 0.03 | 0.50 | 0.02 | — | — | — | — | 0.13 | — | 0.28 |
| | 7 | 96.4 | 0.05 | 0.88 | 1.65 | 0.008 | 0.009 | 0.17 | 0.03 | 0.50 | 0.02 | — | — | — | — | 0.13 | — | 0.17 |
| | 8 | 97.1 | 0.07 | 0.75 | 1.97 | 0.008 | 0.005 | — | — | — | 0.03 | — | — | — | 0.02 | — | — | 0.05 |
| | 9 | 97.0 | 0.07 | 0.75 | 1.97 | 0.008 | 0.005 | — | — | — | 0.11 | — | — | — | 0.02 | — | — | 0.13 |
| | 10 | 96.9 | 0.07 | 0.75 | 1.97 | 0.008 | 0.005 | — | — | — | 0.19 | — | — | — | 0.02 | — | — | 0.20 |
| | 11 | 97.0 | 0.15 | 0.70 | 1.77 | 0.008 | 0.005 | — | 0.04 | — | 0.01 | 0.03 | 0.02 | — | — | 0.19 | — | 0.31 |
| | 12 | 91.4 | 0.04 | 1.46 | 2.45 | 0.010 | 0.005 | — | — | 0.43 | 0.10 | 2.85 | 0.78 | 0.51 | 0.14 | 0.24 | 0.05 | 4.60 |

<Shielding Gas: Ar—$CO_2$ Mixed Gas>

For the flux-cored wire in the present embodiment, an Ar—$CO_2$ mixed gas is used as a shielding gas. When the Ar—$CO_2$ mixed gas is used, oxidation of a deoxidizing agent is prevented by the $CO_2$ gas, and the amount of slag decreases. Therefore, the slag aggregation is improved and the arc stability is also improved. As the ratio of the Ar—$CO_2$ mixed gas, for example, 80% Ar-20% $CO_2$ mixed gas in terms of volume % may be used.

The welding position where the flux wire in the present embodiment is used is not particularly limited, and the effect can be particularly obtained in the case of performing welding by horizontal fillet welding. Furthermore, the thickness of the steel sheath of the flux-cored wire in the present embodiment and the wire diameter (diameter) are not particularly limited, and the flux-cored wire can be applied to a wire having a diameter specified in the welding material standard such as AWS or JIS.

EXAMPLES

Hereinafter, the effects of the present invention are specifically described with reference to Invention Examples according to the present invention and Comparative Examples, but the present invention is not limited thereto.

[Evaluation of Wire]

<Gas Shielded Arc Welding>

Two plate-shaped steel plates were used, and on one steel plate (horizontal plate), the other steel plate was set so as to be in a direction perpendicular to the one steel plate, followed by performing horizontal fillet welding for a fillet portion under the following welding conditions using each of the flux-cored wires in Invention Example and Comparative Example.

(Welding Condition)

Test steel plate: SM490A whose steel plate surface has been ground with a grinder Size of steel plate: thickness 12 mm×width 85 mm×length 430 mm Welding position: horizontal fillet welding current: 250 A to 300 A Welding voltage: appropriate (26 to 31) V Welding speed: 50 cm/min Kind and flow rate of shielding gas: 80% Ar-20% $CO_2$ gas (volume %), 25 liters/min <<Appearance of Bead>>

An appearance of the bead was evaluated by observing the slag aggregation on a surface of a weld metal after welding. The case where the slag had an appropriate size and was finely aggregated was evaluated as ○ (good), and the case where the slag still spottedly adhered to the surface of the weld metal or the slag did not aggregate and thinly covered the surface of the weld metal was evaluated as x (poor).

<<Slag Removability>>

A surface of the weld metal was beaten with a chisel, and the slag removability was evaluated by inspecting whether the slag was removed or not. The case where the slag was easily peeled off from the surface of the weld metal and removed was evaluated as ○ (good), and the case where the slag was not peeled off was evaluated as x (poor).

<<Low-Temperature Toughness>>

Test pieces were taken from the weld metal obtained by the gas shielded arc welding, and each test piece was subjected to a Charpy impact test at −40° C. to measure absorbed energy $vE_{-40°C}$ (J), thereby evaluating the low-temperature toughness. The case where $vE_{-40°C}$ was 50 J or more was evaluated as having excellent low-temperature toughness, and the case where $vE_{-40°C}$ was less than 50 J was evaluated as having poor low-temperature toughness.

The evaluation results of each test are summarized in Table 2 below. In the evaluation result column of the low-temperature toughness, "-" indicates that the measurement was not performed.

TABLE 2

| | | Evaluation result | | |
|---|---|---|---|---|
| | No. | Appearance of bead (Slag aggregation) | Slag removability | Low-temperature toughness $vE_{-40°C}$ (J) |
| Invention Example | 1 | ○ | ○ | 99 |
| | 2 | ○ | ○ | 93 |
| | 3 | ○ | ○ | 104 |
| | 4 | ○ | ○ | 107 |
| | 5 | ○ | ○ | 90 |
| | 6 | ○ | ○ | — |
| | 7 | ○ | ○ | 103 |
| | 8 | ○ | ○ | — |
| | 9 | ○ | ○ | — |
| | 10 | ○ | ○ | — |
| | 11 | ○ | ○ | — |
| Comparative Example | 1 | x | x | 92 |
| | 2 | x | ○ | — |
| | 3 | x | ○ | — |
| | 4 | x | x | 127 |
| | 5 | x | x | 116 |
| | 6 | x | x | 8 |
| | 7 | x | x | 6 |
| | 8 | x | x | — |
| | 9 | x | x | — |
| | 10 | x | x | — |
| | 11 | x | x | 110 |
| | 12 | x | x | — |

As shown in Tables 1 and 2, in Invention Examples Nos. 1 to 11, each wire component was within the numerical range specified in the present invention, and thus, a weld metal having good slag aggregation and slag removability and excellent low-temperature toughness could be obtained.

FIG. 1 is a photograph as a substitute for a drawing showing a surface of a weld metal obtained by welding using the wire in Invention Example No. 1. As shown in FIG. 1, the slag 2 having a uniform size was finely aggregated on a surface of the weld metal 1, so that the appearance of the bead after slag removal was good.

On the other hand, in Comparative Examples Nos. 1, 2, 4, 5, and 8 to 11, the content of the total Mg in the wire was less than the lower limit of the numerical range specified in the present invention, and thus, the slag aggregation was poor and the appearance of the bead was bad. In particular, in Comparative Examples Nos. 1, 4, 5, and 8 to 11, the slag removability was also poor.

In Comparative Examples Nos. 3, 6, and 7, the content of the total Mg in the wire was more than the upper limit of the numerical range specified in the present invention, and thus, the slag aggregation was poor and the appearance of the bead was bad. In particular, in Comparative Examples Nos. 6 and 7, the slag removability was also poor, and the low-temperature toughness was also poor.

In Comparative Example No. 12, the content of the slag forming agent in the wire was more than the upper limit of the numerical range specified in the present invention, and the slag aggregation and the slag removability were poor.

In Comparative Examples Nos. 8 to 10 and 12, the content of the total Li in the wire was less than the lower limit of the numerical range specified in the present invention, and thus, the arc stability was not good.

Figure 2:
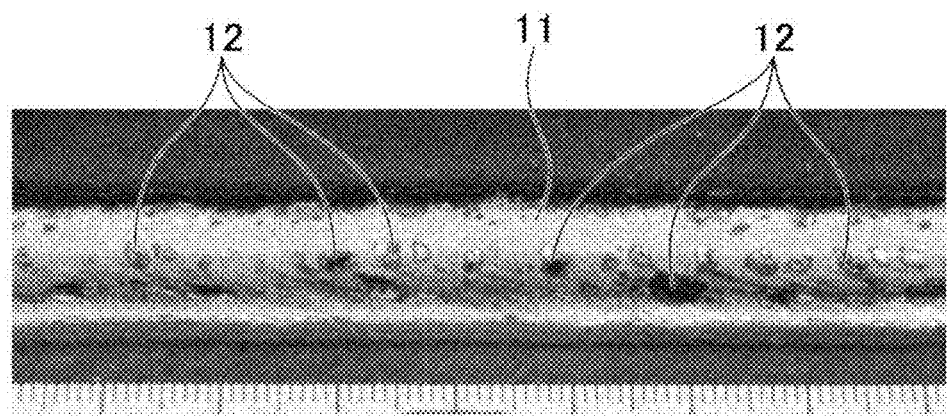
FIG. 2 is a photograph as a substitute for a drawing showing a surface of a weld metal obtained by welding using the wire in Comparative Example No. 1.

FIG. 2 is a photograph as a substitute for a drawing showing a surface of a weld metal obtained by welding using the wire in Comparative Example No. 1. As shown in FIG. 2, the slag 12 spottedly adhered to the surface of the weld metal 11, and thus, the appearance of the bead after slag removal was poor.

Although various embodiments are described above with reference to the drawings, it is needless to say that the present invention is not limited to these embodiments. It will be apparent to those skilled in the art that various changes and modifications may be conceived within the scope of the claims. It is also understood that the various changes and modifications belong to the technical scope of the present invention. Constituent elements in the embodiments described above may be combined freely within a range not departing from the spirit of the present invention.

The present application is based on Japanese Patent Application No. 2019-127697 filed on Jul. 9, 2019, and the contents thereof are incorporated herein by reference.

REFERENCE SIGNS LIST

1, 11 Weld metal
2, 12 Flux

The invention claimed is:

1. A flux-cored wire, suitable for use with an Ar—$CO_2$ mixed gas, which has a steel sheath filled with a flux, the flux-cored wire comprising, as a total of the steel sheath and the flux, in mass % relative to a total wire mass:
   Fe in 92% or more;
   total Si in a range of from 0.70 to 1.50%;
   Mn in a range of from 1.00 to 3.00%;
   Li in a range of from 0.010 to 0.10%; and
   Mg in a range of from 0.02 to less than 0.50%,
   wherein a content of C is 0.15% or less, a content of P is 0.030% or less, a content of S is 0.030% or less, and
   wherein a content of a slag forming agent is 0.26% or less.

2. The wire of claim 1, wherein the slag forming agent comprises a Mg compound, a Li compound, a Ti compound, a Si compound, a Zr compound, a Fe compound, an Al compound, a Na compound, and/or a fluoride.

3. The wire of claim 1, comprising, as the total of the steel sheath and the flux, relative to the total wire mass:
metal Ti in less than 0.17%.

4. The wire of claim 2, comprising, as the total of the steel sheath and the flux, relative to the total wire mass:
metal Ti in less than 0.17%.

5. The wire of claim 1, wherein the slag forming agent comprises a Mg compound.

6. The wire of claim 1, wherein the slag forming agent comprises a Li compound.

7. The wire of claim 1, wherein the slag forming agent comprises a Ti compound.

8. The wire of claim 1, wherein the slag forming agent comprises a Si compound.

9. The wire of claim 1, wherein the slag forming agent comprises a Zr compound.

10. The wire of claim 1, wherein the slag forming agent comprises an Al compound.

11. The wire of claim 1, wherein the slag forming agent comprises a Na compound.

12. The wire of claim 1, wherein the slag forming agent comprises a fluoride.

13. The wire of claim 1, wherein the flux-cored wire comprises, as a total of the steel sheath and the flux, the C in less than 0.11 mass %, relative to a total wire mass.

14. The wire of claim 1, wherein the flux-cored wire comprises, as a total of the steel sheath and the flux, the C in less than 0.10 mass %, relative to a total wire mass.

15. The wire of claim 1, wherein the flux-cored wire comprises, as a total of the steel sheath and the flux, the Mn in a range of from 1.65 to 3.00 mass %, relative to a total wire mass.

16. The wire of claim 1, wherein the flux-cored wire comprises, as a total of the steel sheath and the flux, the Mn in a range of from 1.82 to 3.00 mass %, relative to a total wire mass.

17. The wire of claim 1, wherein the content of the slag forming agent is 0.17% or less.

18. A flux-cored wire, suitable for use with an $Ar$—$CO_2$ mixed gas, which has a steel sheath filled with a flux, the flux-cored wire comprising, as a total of the steel sheath and the flux, in mass % relative to a total wire mass:
Fe in 92% or more;
total Si in a range of from 0.50 to 1.50%;
Mn in a range of from 1.65 to 3.00%;
Li in a range of from 0.010 to 0.10%; and
Mg in a range of from 0.02 to less than 0.50%,
wherein a content of C is 0.15% or less, a content of P is 0.030% or less, a content of S is 0.030% or less, and
wherein a content of a slag forming agent is 0.26% or less.

* * * * *